(12) United States Patent
Deane et al.

(10) Patent No.: US 10,446,044 B2
(45) Date of Patent: *Oct. 15, 2019

(54) SYSTEMS AND METHODS FOR GENERATING AUTOMATED EVALUATION MODELS

(71) Applicant: Educational Testing Service, Princeton, NJ (US)

(72) Inventors: Paul Douglas Deane, Lawrenceville, NJ (US); Brent Bridgeman, Pennington, NJ (US); Chaitanya Ramineni, Princeton Junction, NJ (US)

(73) Assignee: Educational Testing Service, Princeton, NJ (US)

( * ) Notice: Subject to any disclaimer, the term of this patent is extended or adjusted under 35 U.S.C. 154(b) by 670 days.

This patent is subject to a terminal disclaimer.

(21) Appl. No.: 14/306,753

(22) Filed: Jun. 17, 2014

(65) Prior Publication Data
US 2014/0370485 A1 Dec. 18, 2014

Related U.S. Application Data

(63) Continuation-in-part of application No. 14/257,380, filed on Apr. 21, 2014, now Pat. No. 9,443,193.
(Continued)

(51) Int. Cl.
*G09B 7/02* (2006.01)

(52) U.S. Cl.
CPC ..................... *G09B 7/02* (2013.01)

(58) Field of Classification Search
CPC ........... G09B 7/02; G09B 7/00; G06F 17/274; G06F 17/30654
(Continued)

(56) References Cited

U.S. PATENT DOCUMENTS

| 6,181,909 B1* | 1/2001 | Burstein | G09B 7/00 |
| | | | 434/353 |
| 7,831,196 B2* | 11/2010 | Attali | G09B 7/02 |
| | | | 434/353 |

(Continued)

OTHER PUBLICATIONS

Deane, Paul, Williams, Frank, Weng, Vincent, Trapani, Catherine; Automated Essay Scoring in Innovative Assessments of Writing from Sources; Journal of Writing Assessment, 6(1); Aug. 2013.
(Continued)

*Primary Examiner* — Eddy Saint-Vil
(74) *Attorney, Agent, or Firm* — Jones Day

(57) ABSTRACT

A computer-implemented method of calibrating an assessment model for assessing responses includes accessing a plurality of training responses with a processing system for training an assessment model. The processing system analyzes the plurality of training responses to derive values of multiple features of the training responses. The processing system trains the assessment model based on the values of the multiple features of the training responses and a portfolio score for each individual associated with the plurality of training responses utilized in the training. The portfolio score for each individual corresponds to a measure of proficiency based on multiple writing samples constructed by the individual. The processing system determines, based on said training, a weight for each of the multiple features. The processing system calibrates the assessment model to include the weights for at least some of the features such that the assessment model is configured to generate scores for responses.

30 Claims, 9 Drawing Sheets

Related U.S. Application Data

(60) Provisional application No. 61/813,674, filed on Apr. 19, 2013, provisional application No. 61/835,682, filed on Jun. 17, 2013.

(58) Field of Classification Search
USPC .............................. 434/322, 335, 353; 704/9
See application file for complete search history.

(56) References Cited

U.S. PATENT DOCUMENTS

| | | | | |
|---|---|---|---|---|
| 2002/0142277 | A1* | 10/2002 | Burstein | G06F 17/274 434/335 |
| 2005/0277140 | A1* | 12/2005 | Schaeffer | C12Q 1/6883 435/6.16 |
| 2006/0003303 | A1* | 1/2006 | Almond | G09B 7/02 434/322 |
| 2006/0194183 | A1* | 8/2006 | Attali | G09B 7/02 434/322 |
| 2007/0073748 | A1* | 3/2007 | Barney | G06F 17/30675 |
| 2009/0307209 | A1* | 12/2009 | Carmel | G06F 17/3069 |
| 2010/0299139 | A1* | 11/2010 | Ferrucci | G06F 17/30654 704/9 |
| 2011/0173191 | A1* | 7/2011 | Tsaparas | G06F 17/30616 707/723 |

OTHER PUBLICATIONS

Deane, Paul; Using Writing Process and Product Features to Assess Writing Quality and Explore How Those Features Relate to Other Literacy Tasks; Educational Testing Service, Research Report RR-14-03; Jun. 2014.
Almond, Russell, Deane, Paul, Quinlan, Thomas, Wagner, Michael, Sydorenko, Tetyana; A Preliminary Analysis of Keystroke Log Data From a Timed Writing Task; Educational Testing Service, Research Report RR-12-23; Nov. 2012.
Attali, Yigal; Automated Subscores for TOEFL iBT Independent Essays; Educational Testing Service, Research Report RR-11-39; Oct. 2011.
Attali, Yigal, Burstein, Jill; Automated Essay Scoring with E-Rater v.2; Journal of Technology, Learning and Assessment, 4(3); pp. 3-30; Feb. 2006.
Attali, Yigal, Powers, Don; A Developmental Writing Scale; Educational Testing Service, Research Report RR-08-19; Apr. 2008.
Bennett, Randy; CBAL: Results from Piloting Innovative K-12 Assessments; Educational Testing Service, Research Report RR-11-23; Mar. 2012.
Bennett, Randy, Gitomer, Drew; Transforming K-12 Assessment: Integrating Accountability Testing, Formative Assessment, and Professional Support; Educational Testing Service, Research Report RM-08-13; Jul. 2008.
Breland, Hunter, Bridgeman, Brent, Fowles, Mary; Writing Assessment in Admission to Higher Education: Review and Framework; Educational Testing Service, Research Report 99-03; 1999.
Breland, Hunter, Lee, Yong-Won; Muraki, Eiji; Comparability of TOEFL CBT Writing Prompts: Response Mode Analysis; Educational Testing Service, Research Report RR-75; Jul. 2004.
Common Core State Standards Initiative; 2011.
Deane, Paul; Writing Assessment and Cognition; Educational Testing Service, Research Report RR-11-14; Apr. 2011.
Deane, Paul, Fowles, Mary, Baldwin, Douglas, Persky, Hilary; The CBAL Summative Writing Assessment: A Draft Eighth-Grade Design; Educational Testing Service, Research Memorandum RM-11-01; Mar. 2011.
Deane, Paul, Quinlan, Thomas; What Automated Analyses of Corpora Can Tell Us About Students' Writing Skills; Journal of Writing Research, 2(2); pp. 151-177; 2010.
Deane, Paul, Quinlan, Thomas, Kostin, Irene; Automated Scoring Within a Developmental, Cognitive Model of Writing Proficiency; Educational Testing Service, Research Report RR-11-16; Apr. 2011.
Deane, Paul, Odendahl, Nora, Quinlan, Thomas, Fowles, Mary, Welsh, Cyndi, Bivens-Tatum, Jennifer; Cognitive Models of Writing: Writing Proficiency as a Complex Integrated Skill; Educational Testing Service, Research Report RR-08-55; Oct. 2008.
Ericsson, Patricia, Haswell, Richard; Machine Scoring of Student Essays: Truth and Consequences; Utah State University Press: Logan, UT; 2006.
Fu, Jianbin, Wise, Maxwell; Statistical Report of 2011 CBAL Multistate Administration of Reading and Writing Tests; Educational Testing Service, Research Report RR-12-24; Dec. 2012.
Fu, Jianbin, Wise, Maxwell, Chung, Seunghee; Statistical Report of Fall 2009 CBAL Reading Tests; Educational Testing Service, Research Memorandum RM-12-12; May 2012.
Lee, Yong-Won, Gentile, Claudia, Kantor, Robert; Analytic Scoring of TOEFL CBT Essays: Scores from Humans and E-rater; Educational Testing Service, Research Report RR-08-81; Jan. 2008.
Miller, Kristyan; Lindgren, Eva, Sullivan, Kirk; The Psycholinguistic Dimension in Second Language Writing: Opportunities for Research and Pedagogy Using Computer Keystroke Logging; TESOL Quarterly, 42(3); pp. 433-454; Sep. 2008.
Olive, Thierry, Kellogg, Ronald; Concurrent Activation of High- and Low-Level Production Processes in Written Composition; Memory & Cognition, 30(4); pp. 594-600; 2002.
Partnership for Assessment of Readiness for College and Careers (PARCC); Application for the Race to the Top Comprehensive Assessment Systems Competetion; 2010.
Porter, Andrew, McMaken, Jennifer, Hwang, Jun, Yang, Rui; Common Core Standards: The New U.S. Intended Curriculum; Educational Researcher, 40(3); pp. 103-116; 2011.
Rock, JoAnn; The Impact of Short-Term Use of Criterion on Writing Skills in Ninth Grade; Educational Testing Service, Research Report RR-07-07; Mar. 2007.
Sheehan, Kathleen, O'Reilly, Tenaha; The CBAL Reading Assessment: An Approach for Balancing Measurement and Learning Goals; Educational Testing Service, Research Report RR-11-21; May 2011.
Shermis, Mark, Hammer, Ben; Contrasting State-of-the-Art Automated Scoring of Essays: Analysis; In Handbook of Automated Essay Evaluation: Current Applications and New Directions, M. Shermis & J. Burstein (Eds.); Routledge: New York, NY; pp. 323-346; 2012.
Smarter Balanced Assessment Consortium; General Item Specifications; [online] [retrieved Sep. 25, 2015]; Apr. 16, 2012.
Smarter Balanced Assessment Consortium; SBAC Appendices; [online] [retrieved Sep. 25, 2015]; 2012.
State of Florida Department of Education; Invitation to Negotiation: PARCC Item Development; 2012.
Wengelin, Asa, Torrance, Mark, Holmqvist, Kenneth, Simpson, Sol, Galbraith, David, Johansson, Victoria, Johansson, Roger; Combined Eyetracking and Keystroke-Logging Methods for Studying Cognitive Processes in Text Production; Behavior Research Methods, 41(2); pp. 337-351; 2009.
Attali, Yigal; Validity and Reliability of Automated Essay Scoring; Ch. 11 in Handbook of Automated Essay Evaluation: Current Applications and New Directions, M. Shermis & J. Burstein (Eds.); Routledge Academic: New York, NY; pp. 181-198; 2013.
Ben-Simon, Anat, Bennett, Randy; Toward More Substantively Meaningful Automated Essay Scoring; Journal of Technology, Learning, and Assessment, 6(1); Aug. 2007.
Cambridge, D., Cambridge, B., Yancey, K.; Electronic Portfolios 2.0: Emergent Research on Implementation and Impact; Stylus Publishing, LLC; 2009.
Council of Writing Program Administrators; Framework for Success in Postsecondary Writing; Council of Writing Program Administrators, the National Council of Teachers of English and the National Writing Project; Jan. 2011.
Klobucar, Andrew, Deane, Paul, Elliot, Norbert, Ramineni, Chaitanya, Deess, Perry, Rudniy, Alex; Automated Essay Scoring and the Search for Valid Writing Assessment; Ch. 6 in International Advances in Writing Research: Cultures, Places, Measures, C. Bazerman et al. (Eds.); WAC Clearinghouse: Fort Collins, CO; pp. 103-119; 2012.
Ramineni, Chaitanya; Validating Automated Essay Scoring for Online Writing Placement; Assessing Writing, 18; pp. 40-61; 2013.

(56) References Cited

OTHER PUBLICATIONS

Whitely, Susan Embretson; Construct Validity: Construct Representation Versus Nomothetic Span; Psychological Bulletin, 93(1); pp. 179-197; 1983.

* cited by examiner

SYSTEMS AND METHODS FOR GENERATING AUTOMATED EVALUATION MODELS

CROSS-REFERENCE TO RELATED APPLICATIONS

The present application is a continuation-in-part of U.S. patent application Ser. No. 14/257,380 filed Apr. 21, 2014, which claims the benefit of U.S. Provisional Patent Application No. 61/813,674 filed Apr. 19, 2013. The present application also claims the benefit of U.S. Provisional Application Ser. No. 61/835,682 entitled "Alternative Basis For Automated Essay Scoring Using External Validity Criterion," filed Jun. 17, 2013, the entirety of which is hereby incorporated by reference.

FIELD

This disclosure is related generally to automated evaluation models and more particularly to automated evaluation or scoring models for open-ended test responses.

BACKGROUND

Automated scoring models for scoring constructed responses of test takers (examinees) are known in the art and are conventionally trained using a set of training responses to a given test and using associated human-assigned scores. The present inventors have observed a number of potential shortcomings in the conventional training approach, however. For example, the conventional model-training process assumes that the human-assigned scores are reliable. In practice, however, such assumption is often too optimistic, as certain features of the training responses, such as response length, may have unduly influenced the human scorers' evaluations. Consequently, scoring model trained using the traditional process may undesirably reflect such undue bias (e.g., the scoring model may assign unduly high weights to response lengths). In addition, the scoring model may be more susceptible to being "gamed." For example, an examinee who knows that a scoring model places significant weight on response length may attempt to get a better score by lengthening its response without adding substance. Another shortcoming is that such a model may unfairly disadvantage certain populations. For example, if essay length is heavily weighted, an Arabic examinee who is not accustomed to writing from left to right might not generate responses that are as lengthy as those generated by examinees who are so accustomed. Moreover, a scoring model trained to predict human-assigned single test scores may not be the best predictors of more robust measures of writing ability and therefore may not be the most diagnostically useful indicators of performance. Thus, the present inventors have observed a need for an improved method for generating an automated scoring model.

SUMMARY

Systems and methods are described for generating a scoring model for responses. A computer-implemented method of calibrating a scoring model for scoring examinee responses includes accessing a plurality of training responses with a processing system for training the scoring model. The training responses, and the examinee responses to be scored, are constructed responses. The plurality of training responses are analyzed with the processing system to derive values of multiple features of the training responses. The multiple features correspond to variables of the scoring model. The scoring model is trained with the processing system based on the values of the multiple features of the training responses and one or more external measures of proficiency for each individual associated with a training response utilized in the training. The one or more external measures are not derived from the training responses. Based on the training, a weight for at least some of the multiple features is determined. The scoring model is calibrated to include the weights for at least some of the features such that the scoring model is configured to generate scores for examinee responses.

As another example, a non-transitory computer-readable medium is encoded with instructions for causing a processing system to execute steps for calibrating a scoring model for scoring examinee responses. The instructions cause the processing system to access a plurality of training responses for training the scoring model for scoring examinee responses, where the training responses and examinee responses are constructed responses. The instructions cause the processing system to analyze the plurality of training responses to derive values of multiple features of the training responses. The multiple features correspond to variables of the scoring model. The processing system is caused to train the scoring model based on the values of the multiple features of the training responses and one or more external measures of proficiency for each individual associated with a training response utilized in the training. The one or more external measures are not derived from the training responses. The processing system is caused to determine, based on the training, a weight for at least some of the multiple features. The processing system is caused to calibrate the scoring model to include the weights for at least some of the features such that the scoring model is configured to generate scores for examinee responses.

As a further example, a system for calibrating a scoring model for scoring examinee responses includes a processing system and a memory coupled to the processing system. The system is configured to access a plurality of training responses for training the scoring model for scoring examinee responses, where the training responses and examinee responses are constructed responses. The system is configured to analyze the plurality of training responses to derive values of multiple features of the training responses. The multiple features correspond to variables of the scoring model. The system is configured to train the scoring model based on the values of the multiple features of the training responses and one or more external measures of proficiency for each individual associated with a training response utilized in the training. The one or more external measures are not derived from the training responses. The system is configured to determine, based on the training, a weight for at least some of the multiple features. The processing system is configured to calibrate the scoring model to include the weights for at least some of the features such that the scoring model is configured to generate scores for examinee responses.

As a further example, a computer-implemented method of calibrating an assessment model for assessing responses includes accessing a plurality of training responses with a processing system for training an assessment model for assessing responses. The training responses are constructed responses. The processing system analyzes the plurality of training responses to derive values of multiple features of the training responses. The multiple features corresponding to variables of the assessment model. The processing system trains the assessment model based on the values of the multiple features of the training responses and a portfolio score for each individual associated with the plurality of training responses utilized in the training. The portfolio score for each individual corresponds to a measure of proficiency based on multiple writing samples constructed by the individual. The multiple writing samples constructed by each individual do not include any of the plurality of training responses and the portfolio score for each individual is not derived from any of the plurality of training responses. The processing system determines, based on said training, a weight for each of the multiple features. The processing system calibrates the assessment model to include the weights for at least some of the features such that the assessment model is configured to generate scores for responses.

Additionally, systems and methods are described for selecting features for assessment models. A computer-implemented method of identifying stable features includes accessing a plurality of training responses with a processing system. The training responses being constructed responses. The processing system analyzes the plurality of training responses to derive values of multiple candidate features of the training responses. The processing system computes correlation measures based on the derived values of the multiple candidate features and a portfolio score for each individual associated with the plurality of training responses. The portfolio score for each individual corresponds to a measure of proficiency based on multiple writing samples constructed by the individual. The multiple writing samples constructed by each individual do not include any of the plurality of training responses and the portfolio score for each individual is not derived from any of the plurality of training responses. The processing system compares the correlation measures to at least one predetermined selection criterion. The processing system selects a set of features from the multiple candidate features based on said step of comparing.

DETAILED DESCRIPTION

Figure 1:
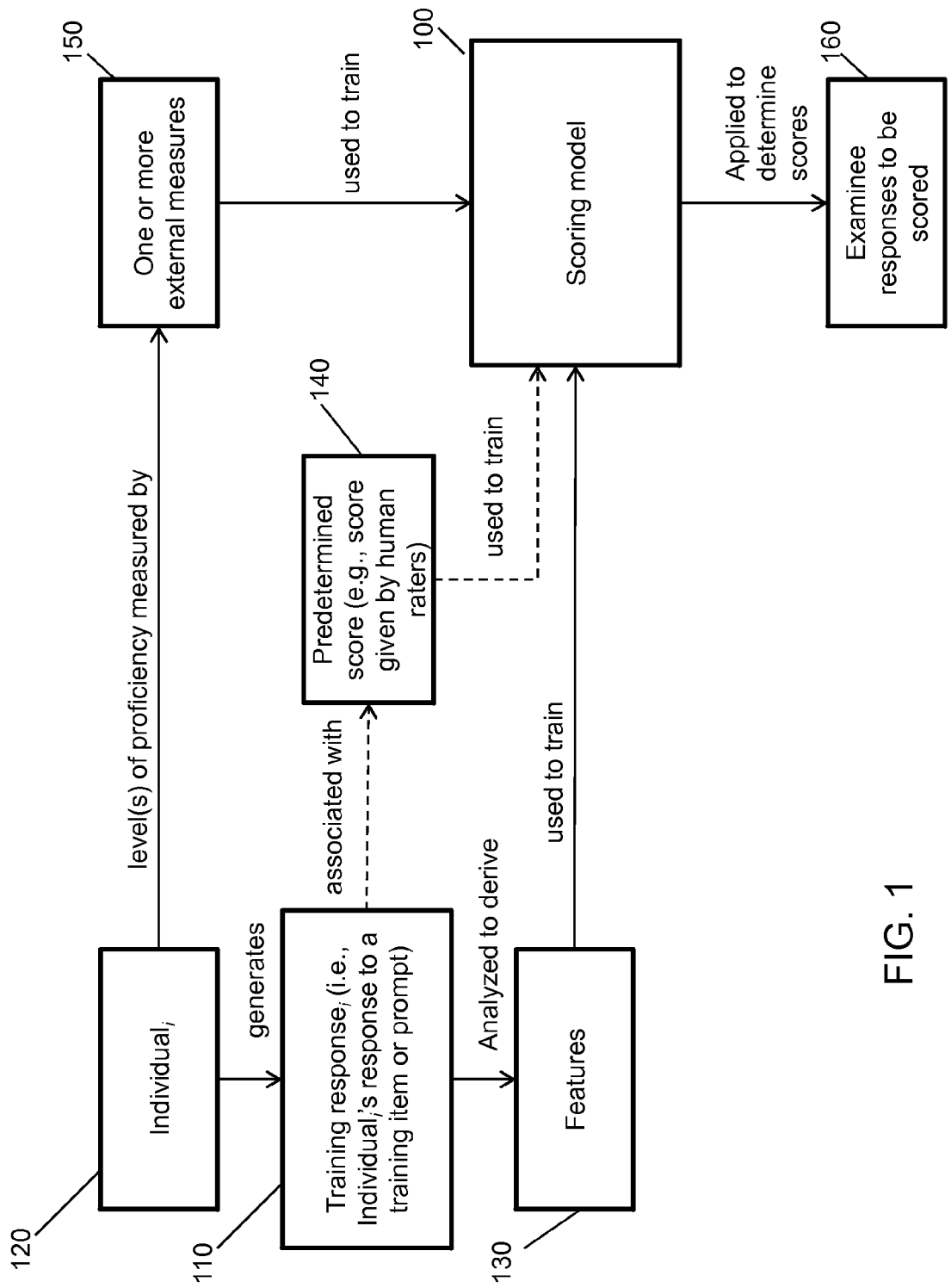
FIG. 1 is a block diagram depicting generation of a scoring model.

Systems and methods described herein for training scoring models for scoring examinee responses are based on one or more of (1) values of multiple features derived from analysis of training responses, (2) external measures of examinee proficiency in the relevant subject matter being scored, where the external measures are not derived from the training responses, and (3) optionally, predetermined (e.g., human-assigned) scores associated with the training responses. Both the training responses, and the examinee responses to be scored, are constructed responses (i.e., responses comprising one or more sentences, a paragraph, an essay of multiple paragraphs, etc., generated by an individual, which may be textual or spoken). Spoken response can be converted to text for analysis using any suitable speech-to-text conversion approaches and algorithms such as those conventionally known to those of ordinary skill in the art. The approaches described herein may improve the reliability and validity of automatically generated scores using a computer grading system for scoring constructed responses.

The training responses may be analyzed to derive values of features that measure each training response's grammar correctness, vocabulary, word usage, mechanics, spelling, word frequency, fluency, etc. This can be done with various numerical measures known to those of ordinary skill in the art. For example, one numerical measure of grammar correctness can be derived from analysis of a constructed response by parsing the associated text for n-grams (e.g., bigrams, trigrams, etc.) for comparison to n-gram statistics from a reference corpus to identify low frequency n-grams in the constructed response compared to the corpus. These numerical frequencies can then be normalized in some suitable way, such as by the word length of the constructed response, to determine a suitable numerical measure of grammar correctness. As another example, a suitable numerical measure for vocabulary can be based on analysis of average word length (number of characters in a word). As a further example, a suitable measure for correction of spelling can be determined from comparison of words in the constructed response to a dictionary to identify a word count of spelling errors, which could be normalized if desired. These and other numerical measures for the quantities above are well known to those of ordinary skill in the art. Similarly, proper mechanics (e.g., punctuation, capitalization, etc.) can be measured by identifying and counting mechanics errors that occur in the text and optionally normalized if desired (e.g., normalized to the length of the constructed response). Measures of fluency in recorded speech can be determined by analysis of various aspects of the speech including speed of the speech, the number and duration of pauses in the speech, etc., as known to those of ordinary skill in the art. Of course, numerical measures that can be used for determining values of the multiple features of constructed responses are not limited to these examples, and any suitable numerical measures for such features may be used.

The external measures, which are not derived from the training responses, are measurements of an individual's proficiency that are relevant to the subject areas intended to be scored by the scoring model. For example, external measures may include an individual's scores from a different test, scores from other sections of the same test that are not derived from the training response items at issue, grades from relevant classes, self-reported competency measures for the individual, competency measures reported by others for the individual, etc. Thus, it will be appreciated that the external measures are not directly related to the training responses. For instance, if a prompt instructed an examinee to read a short essay and then write a two paragraph summary, the external measures would not be derived from the two paragraph summary constructed by the examinee. However, an external measure could be derived, for example, from the score of a different part of the same overall test or a different test, e.g., the score from a true/false section of the same test, a proficiency level from a different part of the same test or a different test, etc.

FIG. 1 is a block diagram depicting one embodiment of the systems and methods for generating scoring models. The system can be implemented using any suitable combination of hardware, software, and/or firmware using algorithms implemented in any suitable programming language such that a processing system of a computer system is configured to carry out the exemplary approaches described herein. A scoring model 100 for scoring a particular examinee response 160 may be trained based on any number of training response items, e.g., 25, 50, 100 or more training responses. A training response$_i$ 110, which is a constructed response, is generated by an individual$_i$ 120 in response to a training item (e.g., a test prompt or essay topic). The training item may be the same as, substantially the same as, or related to the prompt for the examinee response to be scored 160. It is possible that the prompt for the training responses may not be the same as the prompt to be used for obtaining examinee responses in later testing of examinees. The training response$_i$ 110 may be analyzed to derive values for one or more features 130 of the training response$_i$ 110, such as grammar correctness, word usage, mechanics, spelling, word frequency, fluency, etc., as mentioned above. The values for the features 130 may be used to train the scoring model 100, as discussed hereinafter.

Each training response$_i$ 110 may be associated with a predetermined score 140, such as a score given by a human rater. As discussed below, the predetermined score 140 may optionally be used in combination with other information to train the scoring model 100.

The individual$_i$ 120 who generated the training response$_i$ 110 may have a proficiency level(s) (e.g., competency level(s)) measured by one or more external measures 150 in the subject scored. The external measures 150 are termed "external" because they are outside the scope of the training response$_i$ 110 (i.e., not derived from the training response$_i$ 110). For example, if the training response$_i$ 110 is a written response to a section of a writing test, the external measures 150 may include the individual$_i$'s 120 scores on one or more other sections of the test and/or scores on one or more other writing tests. The external measure 150 may also include the individual$_i$'s 120 grades in an English writing class, his self-reported writing proficiency assessment, and any other measures of his writing proficiency, which again are not derived from the training response$_i$ 110.

The scoring model 100 may be constructed to use a variety of frameworks. In general, the scoring model 100 may be represented by a mathematical relationship between a set of independent variables and a set of dependent variables. For example, the mathematical framework could employ a linear model, such as:

$$\text{Score} = a_0 + a_1 \cdot V_1 + a_2 \cdot V_2 + a_3 \cdot V_3 + a_4 \cdot V_4 + \ldots,$$

where Score is a dependent variable whose value may represent the score of a constructed response of an examinee determined according to the scoring model, the variables $V_i$ are independent variables that represent values of the features determined from analyzing the constructed response (e.g., numerical values indicative of grammar correctness, vocabulary, word usage, spelling, word frequency, etc.), and the coefficients $a_i$ represent weighting coefficients for the associated variables $V_i$. More generally, the scoring model is not limited to a linear model such as illustrated above can be a suitable function F of the weighting coefficients $a_i$ and the variables $V_i$, i.e.:

$$\text{Score} = F(a_i, V_i)$$

For example, the function F in the scoring model could combine powers of various variables, products of certain variables, etc., and the choice of the particular mathematical form of the model in this regard is within the purview of one of ordinary skill in the art. In exemplary work conducted by the present inventors, a linear model was used.

The values for at least some of the coefficients $a_i$ are determined through training the model with a training process. For example, it may be desirable to determine values for all of the coefficients, or it may be desirable to determine values for fewer than all of the coefficients, e.g., in a scenario where some coefficients are set and held to fixed values. Various exemplary approaches for training the scoring model are described herein below, all of which utilize values for one or more external measures, such as described above, as one or more dependent variables $M_i$ (e.g., $M_1$, $M_2$, $M_3$, etc.) for training the scoring model. For example, an objective of training the scoring model 100 is to determine values for those weights $a_i$ that would result in an optimal correlation between the independent variables and dependent variables in view of the training responses. The scoring model 100 is calibrated using the determined weights $a_i$ as the coefficients for the associated independent variables and/or selecting a subset of independent variables to use (e.g., independent variables associated with weights falling below a chosen threshold may be excluded from the scoring model 100, such as those weights that are negative or very small, e.g., below 0.01, 0.005, 0.001, etc.). The final set of weighted and selected independent variables are then used as the scoring model 100 for scoring examinee responses.

In one exemplary embodiment, the scoring model 100 may use the values of the features 130 of the training responses 110 as independent variables and may use the values of external measures $M_i$ 150 as the dependent variables, wherein predetermined scores 140 from human scorers for the training response are not utilized whatsoever for training the scoring model 100. This training example is very different from conventional training approaches that rely upon human assigned scores as a basis for training a scoring model because this training example does not rely upon human assigned or predetermined scores for the training responses whatsoever and instead uses external measures not derived from the training responses as dependent variables for training. In this example, the scoring model can be trained by replacing the Score variable on the left hand side with a function of the values of external measures $M_i$, i.e.:

$$G(M_i) = F(a_i, V_i)$$

where $G(Mi)$ is a function of the values of external measures $M_i$, e.g., such as a linear combination $M_1 + M_2 + M_3 + \ldots$, or some other function of the values of external measures $M_i$. The model can then be trained using the computer processing system by accessing the training response for each of a number of individuals (e.g., 50, 100, etc., individuals), processing each of those training responses (which are constructed responses) to determine values for the features (the variables $V_i$) for each of the individuals' training responses, accessing the values for the external measures $M_i$ for each of the individuals, and then processing that system of equations (e.g., 50 or 100 equations, etc., one for each individual) to determine the values for the coefficients $a_i$ that optimize or satisfy suitable correlation criteria between the dependent variables (left side of the equation) and independent variables (right side of the equation), e.g., that provides a best fit to the data. Where multiple dependent variables are utilized in the training process, canonical correlation analysis may be used, for example, in the training process to determine the values of $a_i$. If the scoring model 100 has only one dependent variable, multiple regression analysis may be used, for example, to determine the weights for the independent variables. After the values of weights $a_i$ are determined from training, the scoring model is updated (calibrated) to include the values of those weights $a_i$, and external measures are not included in the scoring model. In this regard, it will be appreciated that the values of the external measures are only temporary dependent variables that are utilized for the process of training the scoring model. That is, the values of the external measures do not themselves make up a permanent component of the scoring model for scoring examinee responses.

In another exemplary embodiment, the scoring model can be trained by using the values of the features 130 as independent variables, by using the predetermined scores 140 as temporary independent variables (as opposed to dependent variables) for purposes of training and by using values of the external measures $M_i$ 150 as temporary dependent variables for purposes of training That is, in this embodiment, the predetermined, e.g., human assigned, scores 140 may be temporary independent variables, meaning that they are used during model training but not included in the final calibrated scoring model for scoring examinee responses. This training example is also very different than conventional training processes that use human assigned scores as dependent variables, because in this training example, human assigned scores are used as independent variables, not dependent variables, and because values of external measures not derived from the training responses are used as dependent variables for training. The training of the model can be carried out as explained in the first example above.

In yet another exemplary embodiment, the scoring model can be trained by using values of the features 130 as independent variables, using values the external measures 150 as dependent variables, and using the predetermined, e.g., human assigned, scores 140 as dependent variables. This training example is also very different than conventional training processes that use human assigned scores as dependent variables, because in this training example, human assigned scores are combined as dependent variables, for purposes of training, with values of external measures not derived from the training responses which are also used as dependent variables for training. The training of the model can be carried out as explained in the first example above.

Note in each of these embodiments, the values of the external measures that are used as dependent variables may be considered as "temporary" variables, since they are using as part of the training process but will not be part of the calibrated scoring model 100 that is used for scoring examinee responses.

In each of these exemplary training processes, the computer processing used for determining the relationship between the variables during the training process may be carried out using any suitable approaches known to one of ordinary skill in the art. For example, as noted above, if the training involves use of two or more dependent variables, the relationship between the independent variables and dependent variables may be analyzed using canonical correlation analysis. If the training involves use of only one dependent variable, multiple regression analysis may be used to determine the weights for the independent variables, for example.

Analyses carried out by the inventors have shown that training processes as described above using values of the features 130 and optionally the predetermined scores 140 as the independent variables, and using values of external measures 150 as the dependent variables, may effectively decrease the weight and importance given to features associated with response length, and may improve the fairness of the resulting machine scores produced by the final scoring model across population groups with different demographic backgrounds.

Figure 2:
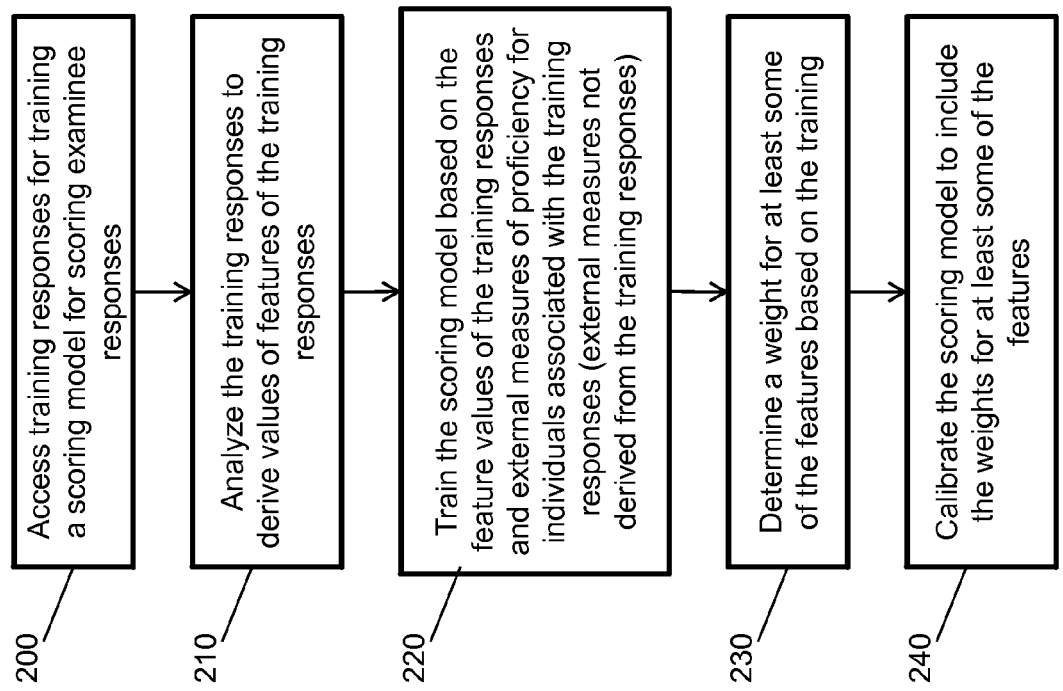
FIG. 2 is a flow diagram depicting a computer-implemented method of generating a scoring model.

FIG. 2 is a flow diagram for an exemplary process for training a scoring model using a processing system. At 200, relevant training responses for a set of individuals are accessed by the processing system for use in training the scoring model. Training responses may be considered relevant, for example, if they substantially represent the examinee responses intended to be scored by the scoring model. For example, if the scoring model is intended to score written essay responses to a particular test prompt, the training responses may be written essay responses to that same or a substantially similar test prompt. If the scoring model is intended to score spoken responses, the training responses may similarly be spoken responses (in which case the responses can be processed by convention speech-to-text algorithms to provide text to be processed according to the approaches described herein). In addition, it may be beneficial for the training responses to represent those for a cross section of performance levels of the associated individuals, e.g., excellent, very good, satisfactory, unacceptable, for instance, so as to provide a broad cross section across proficiency levels for satisfactory training. The particular scoring model used—as well as its associated independent and dependent variables—may be selected, configured, programmed, or installed using any conventional means known by one of ordinary skill in the art, in accordance with the approaches for training described above. As discussed above, the training of a scoring model may utilize values for features of training responses as independent variables, values for one or more external measures not derived from training responses as dependent variables, and optionally predetermined, e.g., human assigned, scores of training responses as either independent variables or dependent variables, if predetermined scores are used in training.

At 210, the processing system analyzes each training response to derive values of the features of that training response (e.g., grammar correctness, vocabulary, etc.). As described above, any suitable methods such as those conventionally known to those of skill in the art may be used to derive values for the features.

At 220, the processing system trains the scoring model based on the derived feature values of the training responses and values of the external measures of proficiency for individuals associated with the training responses (again, the external measures are not derived from the training responses). The particular features (e.g., grammar correctness) and external measures (e.g., other class grades) used in the training can depend on the particular scoring model selected. As noted above in one embodiment, features of training responses are used as independent variables in the scoring model, and external measures are used as temporary dependent variables for purposes of training the model (but are not included in the final calibrated scoring model for scoring examinee responses). Depending on the training approach selected, predetermined scores associated with the training responses may or may not be used for training. If used, the predetermined scores may be used together with the values of the external measures as dependent variables for purposes of training. Alternatively, the predetermined score may be used together with the values of the features as independent variables for purposes of training, in which case the predetermined scores would be temporary independent variables (i.e., they are used during model training but will not be part of the calibrated scoring model for scoring examinee responses).

The independent variables' correlation with the dependent variables may be assessed using any suitable approaches as described above. For example, canonical correlation analysis may be used for training that involves multiple dependent variables, and multiple regression analysis may be used for training that involves only a single dependent variable. The training method analyzes the training responses and, at 230, determines weights for the independent variables (e.g., features), e.g., that optimize their correlation with the dependent variables (e.g., external measures) or otherwise satisfy selected training criteria, e.g., provides a best fit or acceptable fit according to criteria selected by the designer of the model.

At 240, the weights assigned to the independent variables are used to calibrate the scoring model for scoring examinee responses. In one exemplary embodiment, each weighted feature may be used in the calibrated scoring model, regardless of the weight. In another exemplary embodiment, a feature with an insignificant weight or a negative weight may cause the feature to be excluded from the calibrated scoring model (e.g., the weight for that feature may be set to zero), for instance. As noted previously, if temporary independent variables were used to train the model, such as predetermined scores of training responses used as temporary independent variables, those temporary independent variables are not included in the calibrated scoring model for scoring examinee responses.

In another exemplary embodiment, a further training process may be carried out to refine the scoring model. For example, if one training process yields coefficients for variables where the coefficients are negative or fall below associated threshold values, those features may be removed from the scoring model undergoing training, and another training process may be carried without those features. In such a case, the additional training may yield coefficients for variables that are different from those obtained in the prior training process. The model can then be calibrated (updated) to exclude the features that were removed and to use the coefficients for the remaining features that serve as independent variables in the scoring model.

The scoring model, once calibrated based on the weights, can be used to automatically score examinee responses. Such scoring can be carried out by processing an examinee constructed response with a computer processing system to determine values of the features of permanence utilized, e.g., those that may be indicative of grammar correctness, vocabulary, word usage, mechanics, spelling, word frequency, fluency, etc., and applying the calibrated scoring model to those measures. Performance of the calibrated scoring model may be validated, if desired, by comparing the automatically generated scores with their associated external measures and/or predetermined scores, e.g., human assigned scores, (if any) for constructed responses using an independent sample of individuals outside the training sample. Using the described systems and methods, the correlation between the automatically generated scores and their respective external measures used in model training) may be improved so as to provide a useful and reliable scoring model for constructed responses of examinees.

In another exemplary embodiment, automated assessment models may be trained to predict students' overall writing proficiency based on much smaller writing samples, such as 30-minute timed writing tests. Unlike conventional models trained to predict human-assigned scores for the timed writing tests—which do not adequately represent overall writing proficiency—the automated assessment model may be trained to predict external validity criteria that better represent a person's overall writing proficiency. Notably, such external validity criteria may be temporally and/or conceptually separated from the tests or essays designed to be assessment by the model. In other words, the external validity criteria are not derived from the training responses (e.g., the timed writing tests).

Figure 3:
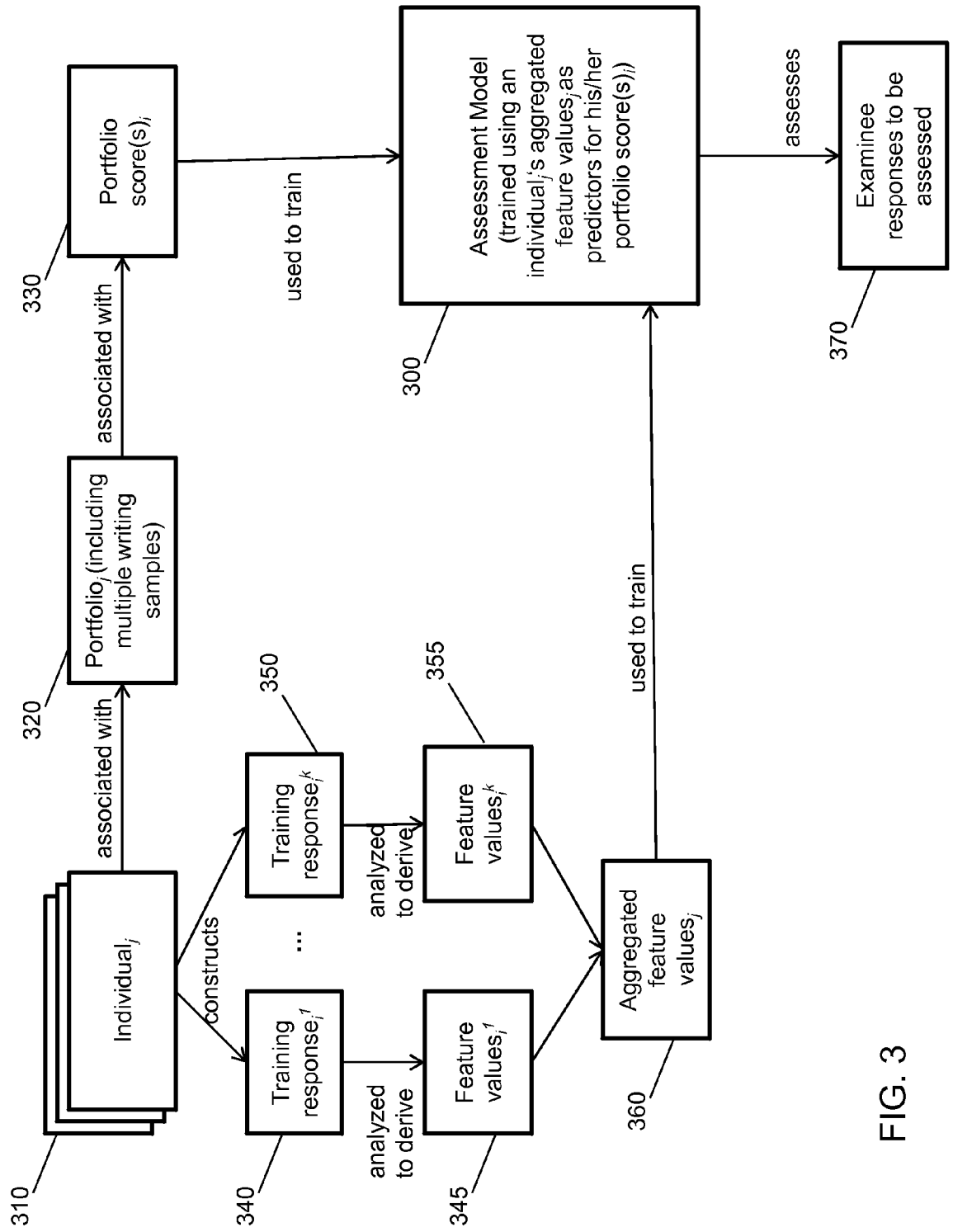
FIG. 3 is a block diagram depicting generation of a scoring model using portfolio scores.

FIG. 3 is a block diagram depicting another exemplary system for generating an assessment models using external validity criteria such as portfolio scores. The system can be implemented using any suitable combination of hardware, software, and/or firmware using algorithms implemented in any suitable programming language such that a processing system of a computer system is configured to carry out the exemplary approaches described herein. An assessment model 300 for assessing a particular examinee response 370 may be trained based on any number of training response items (e.g., 25, 50, 100 or more) constructed by individuals 310. The training responses, which are constructed responses, may be generated by individuals 310 in response to a training item (e.g., a test prompt or essay topic). The training item may be the same as, substantially the same as, or related to the prompt for the examinee response to be assessed 370. It is possible that the prompt for the training responses may not be the same as the prompt to be used for obtaining examinee responses in later testing of examinees.

Each individual$_j$ 310 may be associated with one or more training responses (e.g., training response$_j^1$ 340 to training response$_j^k$ 350). As described above, the training responses may be analyzed to derive values for one or more features, such as numerical measures of grammar correctness, word usage, mechanics, spelling, word frequency, fluency, etc. Numerical measures for such features may be determined through computerized analysis of constructed tests such as previously described herein. In FIG. 3, the individual$_j$'s 310 training response$_j^1$ 340 may be analyzed to derive feature values$_j^1$ 345, and more generally the individual$_j$'s 310 training response$_j^k$ 350 may be analyzed to derive feature values$_j^k$ 355. The feature values may be used to train the assessment model 370, as discussed hereinafter.

Each individual$_j$ 310 associated with the training responses 340, 350 may be associated with a portfolio$_j$ 320 of multiple writing samples constructed by the individual$_j$ 310. The writing samples in a portfolio$_j$ 320 ideally would be a collection of different writings that are collectively representative of the individual$_j$'s 310 writing proficiency. For example, the writing samples may include expository writing, memoir-style essays, final research paper, literary essays, technical papers, journal articles, timed-writings, or any other types of writing. Aside from the fact that each writing sample within the same portfolio$_j$ 320 are all constructed by the same individual$_j$ 310, the writing samples may be completely unrelated to one another. For example, the writing samples may be on different topics/genres, constructed under different writing conditions (e.g., some may be timed essays, others may have had length restrictions, and other may not have been constructed under any restrictions), or different in any other way. Similarly, the writing samples may be on different topics/genres, constructed under different writing conditions, or different in any other way from the training responses (e.g., training response$_j^k$ 350) and the response to be assessed 370.

Each portfolio$_j$ 320 may be associated with one or more portfolio scores$_j$ 330. A portfolio score$_j$ 330 may be a human-assigned assessment measure based on a review of the writing samples in the portfolio$_j$ 320. Alternatively, the portfolio score$_j$ 330 could be a score generated in whole or in part by another automated computer analysis of the writing samples in the portfolio$_j$ 320. The human rater assigning the portfolio scores$_j$ 330 may take into consideration any aspect of the writing samples that may be of interest. For example, in addition to writing style, mechanics, fluency, etc., the human rater may also take into consideration other indicators of post-secondary school success, such as knowledge of conventions, writing processes, critical thinking, rhetorical knowledge, etc. Notably, since the portfolio scores are derived from the writing samples in portfolio$_j$ 320, and since the portfolio$_j$ 320 as described above may be unrelated to the training responses (e.g., training response$_j^k$ 350) or the response to be assessed 370, it can be appreciate that the portfolio scores$_j$ 330 is not directly related to or derived from the training responses or the responses to be assessed 370.

The portfolio scores$_j$ 330, serving as the external validity criteria, may be used with the derived feature values (e.g., feature values$_j^k$ 355) to train the assessment model 300. The assessment model 300 may be constructed based on a variety of frameworks. Similar to previously described embodiments, the assessment model may in general be represented by a mathematical relationship between a set of independent variables and a set of dependent variables. For example, the mathematical framework could employ a linear model, such as:

$$\text{Assessment Value} = c_0 + c_1 \cdot I_1 + c_2 \cdot I_2 + c_3 \cdot I_3 + c_4 \cdot I_4 + \ldots,$$

where Assessment Value is a dependent variable whose value may represent an assessment of an examinee's constructed response according to the assessment model, the variables $I_i$ are independent variables that represent values of the features determined from analyzing the examinee's constructed response (e.g., numerical values indicative of grammar correctness, vocabulary, word usage, spelling, word frequency, etc.), and the coefficients $c_i$ represent weighting coefficients for the associated variables $I_i$. More generally, the assessment model is not limited to a linear model such as illustrated above but can be a suitable function F of the weighting coefficients $c_i$ and the variables $I_i$, i.e.:

$$\text{Assessment Value} = A(c_i, I_i).$$

For example, the function A in the assessment model could combine powers of various variables, products of certain variables, etc., and the choice of the particular mathematical form of the model in this regard is within the purview of one of ordinary skill in the art. In exemplary work conducted by the present inventors, a linear model was used.

The values for at least some of the coefficients $c_i$ are determined through training the model with a training process. For example, it may be desirable to determine values for all of the coefficients, or it may be desirable to determine values for fewer than all of the coefficients, e.g., in a scenario where some coefficients are set and held to fixed values. Various exemplary approaches for training the assessment model are described herein below, all of which utilize external validity criteria, such as the portfolio scores$_j$ 330 described above, as one or more dependent variables $D_i$ (e.g., $D_1$, $D_2$, $D_3$, etc.) for training the assessment model. For example, an objective of training the assessment model 300 is to determine values for those weights $c_i$ that would result in an optimal correlation between the independent variables and dependent variables in view of the training responses. The assessment model 300 is calibrated using the determined weights $c_i$ as the coefficients for the associated independent variables and/or selecting a subset of independent variables to use (e.g., independent variables associated with weights falling below a chosen threshold may be excluded from the assessment model 300, such as those weights that are negative or very small, e.g., below 0.01, 0.005, 0.001, etc.). The final set of weighted and selected independent variables are then used as the assessment model 300 for assessing examinee responses.

In one exemplary embodiment where each individual$_j$ 310 is associated with multiple training responses (e.g., training response$_j^1$ 340 to training response$_j^k$ 350), the associated feature values (e.g., feature values$_j^1$ 345 to feature values$_j^k$ 355) may be aggregated to generate aggregated feature values$_j$ 360 for the individual$_j$ 310. For example, if feature values$_j^1$ 345 includes values for three features, the feature values$_j^1$ 345 may be represented by $\{x_j^1, y_j^1, z_j^1\}$. Similarly, if feature values$_j^k$ 345 also has the same three features, it may be represented by $\{x_j^k, y_j^k, z_j^k\}$. Feature value $x_j^1$ to feature value $x_j^k$ may be related to the same feature (e.g., word length); feature value $y_j^1$ to feature value $y_j^k$ may be related to a different feature (e.g., vocabulary), and feature value $z_j^1$ to feature value $z_j^k$ may be related to yet another feature (e.g., grammar correctness). In this example, aggregating the feature values associated with the individual$_j$ 310 may involve taking the average value of each feature type (i.e., x, y, z) found in feature values$_j^1$ 345 to feature values$_j^k$ 355. Specifically:

$$Avg(x_j) = \sum_{n=1}^{k} \frac{x_j^n}{k}$$

$$Avg(y_j) = \sum_{n=1}^{k} \frac{y_j^n}{k}$$

$$Avg(z_j) = \sum_{n=1}^{k} \frac{z_j^n}{k}$$

Thus, the individual$_j$'s 310 associated aggregated feature values$_j$ 360 may be represented by $\{Avg(x_j), Avg(y_j), Avg(z_j)\}$. More generally stated, the aggregated feature values$_j$ 360 may be derived from aggregating the values of like features across the individual$_j$'s 310 associated feature values (e.g., feature values$_j^k$ 355), such that the aggregated feature values$_j$ 360 include a single representative value for each of the feature types (e.g., x, y, and z in the above example). It will be appreciated that "aggregation" is not limited to taking the average, but may also include summation, taking the maximum/minimum, or any other mathematical formulation that generates a single output value. In addition, the values of each feature type may be aggregated differently. For example, the above $x_j^1$ to $x_j^k$ may be aggregated by taking the average, $y_j^1$ to $y_j^k$ may be aggregated by taking the summation, and $z_j^1$ to $z_j^k$ may be aggregated by taking the maximum value. The described process of aggregating feature values, however, may not be utilized in some exemplary embodiments if, for example, doing so is not desired or if each individual$_j$ 310 only has a single associated training response$_j^1$ 310. If no aggregation is performed, then during training the feature values$_j^k$ 355 may be used as the independent variables (i.e., $I_i$) in the assessment model instead of the aggregated feature values$_j$ 360, as will be described hereinafter.

As described above, the assessment model 300 may be based on any suitable mathematical framework. For example, the assessment model's 300 independent variables may each represent a feature of the training responses. With respect to the assessment model's 300 dependent variable, if each portfolio$_j$ 320 is associated with a single portfolio$_j$ score 330 (or if only one of many portfolio scores$_j$ 330 are of interest), then the dependent variable may be the portfolio score. If, on the other hand, multiple portfolio scores$_j$ 330 are available or of interest, then the dependent variables may be formulated as a mathematical expression of the portfolio scores$_j$ 330 (e.g., a linear combination $D_1+D_2+D_3+\ldots$). In one example, training of the model described above does not utilize any human-assigned score associated with the training responses whatsoever, which is very different from conventional training approaches as described above.

The assessment model 300 may be trained based on each individual$_j$'s 310 associated aggregated feature values$_j$ 360 (or alternatively the associated feature values$_j^k$ 355 if no aggregation was performed) and portfolio score(s)$_j$ 330. The computer processing system may first access the one or more training responses constructed by each of a number of individuals (e.g., 50, 100, etc., individuals), process each of those training responses to determine values for the features, optionally aggregate the values of like features, access the portfolio scores (or other external validity criteria) associated with each of the individuals, and then process that system of equations (e.g., 50 or 100 equations, etc., one for each training response$_j^k$ or one for each set of aggregated feature values$_j$, depending on whether aggregation is used) to determine the values for the coefficients (e.g., $c_i$) that optimize or satisfy suitable correlation criteria between the dependent variables (left side of the equation) and independent variables (right side of the equation) to provide, for example, a best fit to the data. Where multiple dependent variables are utilized in the training process (e.g., where multiple portfolio scores$_j$ are used for each portfolio$_j$), canonical correlation analysis may be used, for example, in the training process to determine the values of $c_i$. If the assessment model 300 has only one dependent variable (i.e., a single portfolio scores$_j$ is used for each portfolio$_j$), multiple regression analysis may be used, for example, to determine the weights $c_i$ for the independent variables. In each of these exemplary training processes, the computer processing used for determining the relationship between the variables during the training process may be carried out using any suitable approaches known to one of ordinary skill in the art.

After the values of weights $c_i$ are determined from training, the assessment model 300 is updated (calibrated) to include the values of those weights $c_i$. Notably, portfolio scores (or other external validity criteria used) are not included in the assessment model 300. In this regard, it will be appreciated that the portfolio scores are only temporary dependent variables that are utilized for the process of training the assessment model 300. That is, the values of the portfolio scores do not themselves make up a permanent component of the assessment model for assessing examinee responses. Once trained, the assessment model 300 may be used to assess examinee responses or writings 370.

Figure 4:
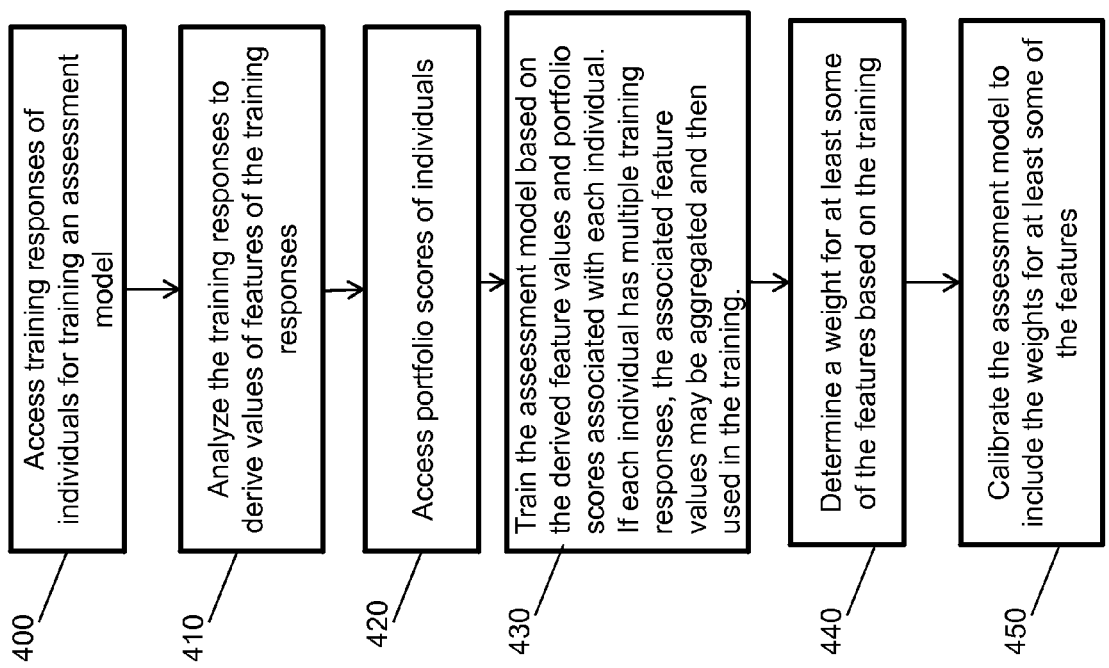
FIG. 4 is a flow diagram depicting a computer-implemented method of generating a scoring model using portfolio scores.

FIG. 4 is a flow diagram for an exemplary process for training an assessment model using a processing system. At 400, the processing system accesses relevant training responses for a set of individuals for use in the training process. Training responses may be considered relevant, for example, if they substantially represent the examinee responses intended to be assessed by the assessment model. For example, if the assessment model is intended to assess written essay responses to a particular test prompt, the training responses may be written essay responses to that same or a substantially similar test prompt.

At 410, the processing system analyzes each training response to derive values of the candidate features of that training response (e.g., grammar correctness, vocabulary, etc.). As described above, any suitable methods such as those conventionally known to those of skill in the art may be used to derive values for the candidate features.

At 420, the processing system accesses external validity criteria, which in the depicted example are portfolio scores, associated with the individuals. Each portfolio score is derived from an individual's portfolio of constructed writing samples, as described above. Again, the writing samples do not include the training responses and therefore the portfolio scores are not derived from any of the training responses.

At 430, the processing system trains the assessment model based on the derived feature values of the training responses and the external validity criteria (e.g., the portfolio scores). As noted above in one embodiment, features of training responses are used as independent variables in the assessment model, and portfolio scores are used as temporary dependent variables for purposes of training the model (but are not included in the final calibrated assessment model for assessing examinee responses).

Training of the model may be carried out such as described above. For example, canonical correlation analysis may be used for training that involves multiple dependent variables (e.g., if each portfolio is associated with more than one portfolio score), and multiple regression analysis may be used for training that involves only a single dependent variable (e.g., each portfolio is associated with a single portfolio score).

The data sets used in the training may vary, as described above. If an individual is associated with multiple training responses, the associated feature values derived from those training responses may be aggregated to derive aggregated feature values. As noted above, any method of aggregating (e.g., taking the average) the feature values to derive, for example, a single value for each feature may be used. The aggregated feature values may then be used as the values for the independent variables in the assessment model. If, on the other hand, an individual is associated with a single training response or if aggregation is not desired, then the non-aggregated feature values derived from each training response can be used as the values for the independent variables.

The training method analyzes the training data set and, at 440, determines weights for the independent variables (e.g., features), e.g., that optimize their correlation with the dependent variables (e.g., external validity criterion such as portfolio score) or otherwise satisfy selected training criteria, e.g., that provides a best fit or acceptable fit according to criteria selected by the designer of the model.

At 450, the weights assigned to the independent variables are used to calibrate the assessment model for assessing examinee responses. In one exemplary embodiment, each weighted feature may be used in the calibrated assessment model, regardless of the weight. In another exemplary embodiment, a feature with an insignificant weight or a negative weight may cause the feature to be excluded from the calibrated assessment model (e.g., the weight for that feature may be set to zero), for instance.

The assessment model, once calibrated based on the weights, can be used to automatically assess examinee responses. Such assessment can be carried out by processing an examinee constructed response with a computer processing system to determine values of the features utilized (e.g., those that may be indicative of grammar correctness, vocabulary, word usage, mechanics, spelling, word frequency, fluency, etc.), and applying the calibrated assessment model to those feature values. Using the described systems and methods, an automated assessment model can be generated to analyze constructed responses of examinees to predict the examinees' overall writing proficiency.

Figure 5:
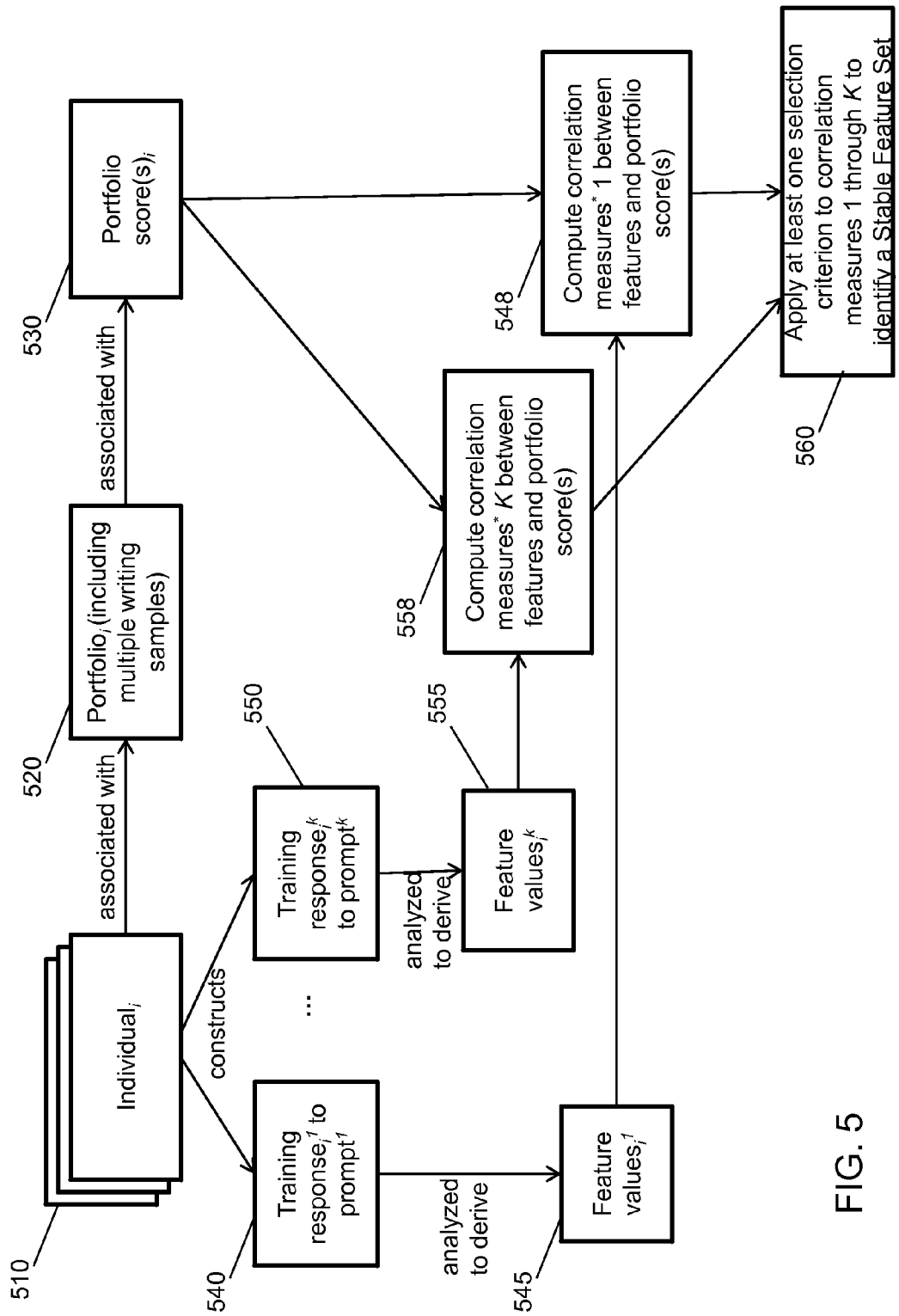
FIG. 5 is a block diagram depicting selection of features to be used in a scoring model.

Exemplary approaches for selecting features for an assessment model will now be described. FIG. 5 is a block diagram depicting an exemplary embodiment for selecting features to be used in an assessment model. Conventional methods for selecting features typically use a training data set that includes training responses that are each constructed by a different individual (i.e., the ratio of individual to training response is one-to-one). Such methods may fail to identify features that are stable (i.e., reliable predictors) across the writing tasks or occasions of each individual. Thus, the inventors have contemplated a method for feature selection that utilizes multiple training responses per individual (i.e., the ratio of individual to training response is one-to-many) in order to identify features that not only stable across individuals, but also stable across the writings of individuals.

FIG. 5 depicts each individual$_i$ 510 having constructed multiple training responses (i.e., training response$_i^1$ 540 to training response$_i^k$ 550). Each training response may be related to a particular topic, subject matter, writing condition, etc. For example, in FIG. 5, training response$_i^1$ 540 is shown to be in response to prompt$^1$, and response$_i^k$ 550 is shown to be in response to prompt$^k$. Each of the individuals may have constructed a set of training responses that are related to a similar set of prompts, topics, subject matters, writing conditions, etc. For example, an individual$_1$ may be associated with a training response$_1^1$ related to a prompt$^1$, and individual$_2$ may be associated with a training response$_2^1$ related to the same or substantially similar prompt$^1$. Thus, each individual may have a training response that corresponds to another individual's training response.

The training responses may be analyzed by a computer processing system to derive feature values, as described above. For example, training response$_i^1$ 540 is analyzed to derive feature values$_i^1$ 545, and training response$_i^k$ is analyzed to derive feature values$_i^k$ 555. Sets of feature values derived from corresponding training responses are said to correspond to each other. For example, an individual$_1$ may be associated with feature values$_1^1$ derived from training response$_1^1$, and individual$_2$ may be associated with feature values$_2^1$ derived from training response$_2^1$. If response$_1^1$ corresponds to response$_2^1$ (e.g., because they are both responses to the same prompt$^1$), the derived feature values$_1^1$ are said to correspond to feature values$_2^1$.

Corresponding feature values associated with different individuals (e.g., individual$_1$'s feature values$_1^1$, individual$_2$'s feature values$_2^1$, individual$_3$'s feature values$_3^1$, ..., individual$_i$'s feature values$_i^1$) are then used as data points to compute correlation measures between the features and the external validity criteria associated with the individuals. This may, for example, result in one set of correlation measures for each set of corresponding feature values (e.g., correlation measures 548 is determined base on corresponding feature values$_1^1$, feature values$_2^1$, feature values$_3^1$, ..., feature values$_i^1$). As used herein, a correlation measure between a feature and an external validity criterion is a numerical value that represents how strongly/weakly feature correlates with the external validity criterion. One example of an external measure is portfolio scores. FIG. 5 reflects this by depicting each individual$_i$ 510 as being associated with a portfolio$_i$ 520 (which includes multiple writing samples constructed by the individual$_i$ 510), which in turn is depicted as being associated with a human-assigned portfolio score(s)$_i$ 530, as described hereinabove.

The processing system may compute multiple sets of correlation measures, each of which may be based on a set of corresponding feature values associated with different individuals. For example, the data set used to compute a particular set of correlation measures 548 may include an individual$_1$'s associated feature values$_1^1$ and portfolio score$_1$; an individual$_2$'s associated feature values$_2^1$ and portfolio score$_2$; and an individual$_i$'s 510 associated feature values$_i^1$ 545 and portfolio score$_i$ 530, and so forth. Similarly, another set of correlation measures 558 may be computed based on a data set that includes the individual$_1$'s associated feature values$_1^k$ and portfolio score$_1$; the individual$_2$'s associated feature values$_2^k$ and portfolio score$_2$; and the individual$_i$'s 510 associated feature values$_i^k$ 555 and portfolio score$_i$ 530, and so forth. Thus, for each feature (e.g., grammar correctness) there may be multiple associated correlation measures—each from a different set of correlation measures, such as 548 and 558—measuring that feature's correlation with the portfolio scores. Having multiple correlation measures for each feature enables the stability of that feature to be checked across different sets of training responses.

One of ordinary skill in the art would appreciate that any conventional means for assessing correlation may be utilized to compute the correlation measures. For example, pair-wise correlation analysis (e.g., Pearson r) between two variables can be used to compute the correlation measure between the portfolio score and each feature. In such an instance, each set of correlation measures (e.g., 548 or 558) may include a set of values ranging from −1 to 1, each of which represents the Pearson correlation of a particular feature to the portfolio score. For example, for each of multiple features (e.g., grammar correctness, fluency, vocabulary, etc.), a pair-wise correlation value can be generated based on that feature's corresponding feature values (e.g., feature value$_1^1$, feature value$_2^1$, ..., feature value$_i^1$) derived from different individuals' corresponding training responses (e.g., training response$_1^1$, training response$_2^1$, ... training response$_i^1$). Each such pair-wise correlation value assesses the level of correlation of that feature to the portfolio score, based on one set of correlated training responses. As another example, the relationship between features and portfolio score may be represented by a linear combination (i.e., the features being the independent variables and the portfolio score being the dependent variable), and multiple regression analysis may be used to determine coefficients for the features. In that example a set of correlation measures can be the determined coefficients. Notably, different sets of correlation measures may be computed using different types of correlation analysis.

A predetermined selection criterion or criteria 560 may then be used to analyze the sets of correlation measures (e.g., 548 and 558) to identify features that consistently correlate well with the portfolio score. For example, one selection criterion may require a feature's correlation measures to all exceed a predetermined threshold (e.g., 0.2) in order for that feature to be selected. Other examples of the selection criterion may require an average of a feature's correlation measures to exceed a predetermined threshold; 75% of a feature's correlation measures to exceed a predetermined threshold; etc. A selection criterion may also be based on a relative ranking of the features' average correlation measures (e.g., the tope-ten features with the highest average correlation measures are selected). In addition, the selection criterion may apply different tests for different correlation measures of the same feature. For example, if the correlation measures 548 were computed using Pearson r, and the correlation measures 558 were computed using multiple regression analysis, a selection criterion may require a particular feature's correlation measure 548 to exceed 0 and correlation measure 558 to exceed 0.2 in order for the feature to be selected. Based on any combination of selection criteria, a set of stable features can be selected and used in an assessment model.

In another exemplary embodiment, both the selected features and the non-selected features may be used in an intermediate assessment model for further validation. The intermediate assessment model may be trained as described herein, and the resulting weights for the features (including both the selected and non-selected features) may then be used to further assess the predictiveness of the features. At this stage another set of selection criteria may be applied to make a final selection of the features. For example, in order for a feature to make the final selection, a selection criterion may require a previously selected feature to have a weight of at least a particular threshold (e.g., >0.1), and a previously non-selected feature to have a weight of at least a higher threshold (e.g., >0.3). The final selected features are then used in a final assessment model, which can then be trained/calibrated.

Figure 6:
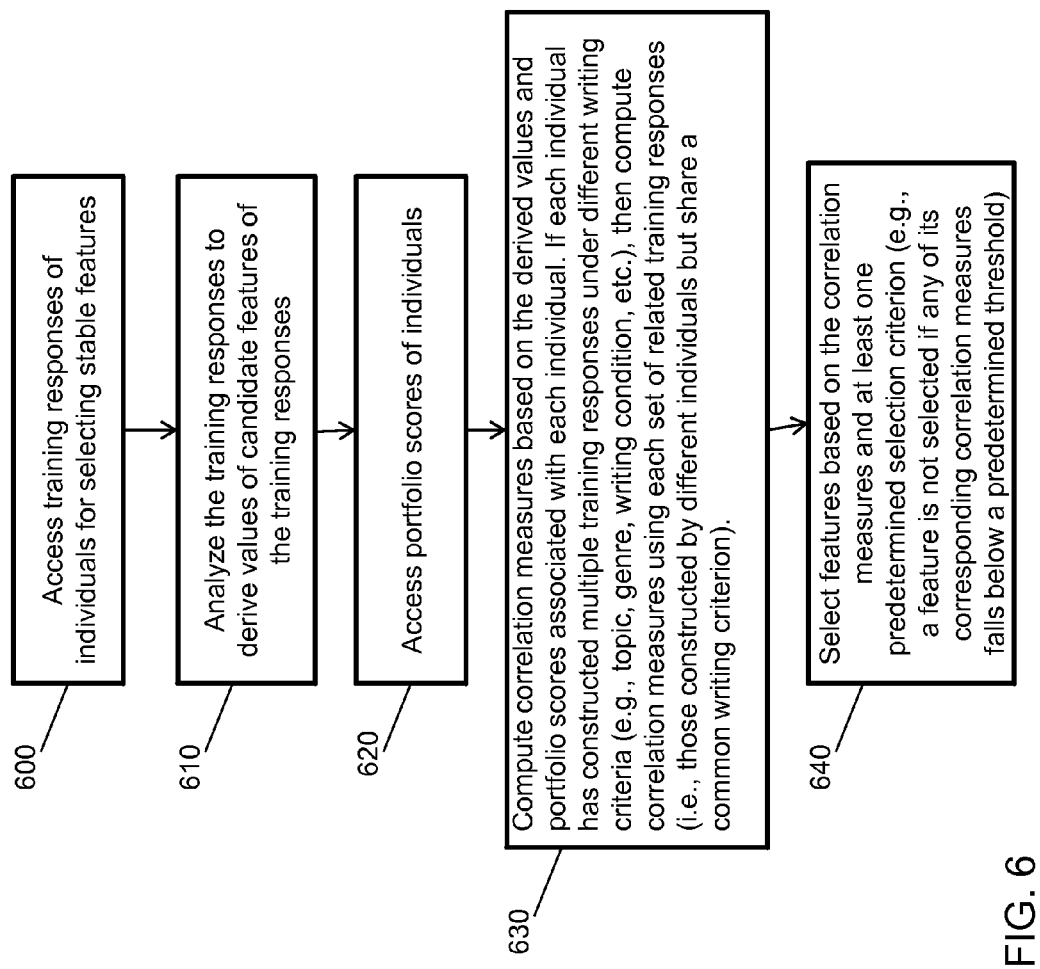
FIG. 6 is a flow diagram depicting a computer-implemented method of selecting features to be used in a scoring model.

FIG. 6 is a flow diagram for an exemplary process for selecting features for an assessment model using a processing system. At 600, the processing system accesses relevant training responses for a set of individuals for use in the selection process. Training responses may be considered relevant, for example, if they substantially represent the examinee responses intended to be assessed by the assessment model. For example, if the assessment model is intended to assess written essay responses to a particular test prompt, the training responses may be written essay responses to that same or a substantially similar test prompt.

At 610, the processing system analyzes each training response to derive values of the candidate features of that training response (e.g., grammar correctness, vocabulary, etc.). As described above, any suitable methods such as those conventionally known to those of skill in the art may be used to derive values for the candidate features.

At 620, the processing system accesses external validity criteria, which in the depicted example are portfolio scores, associated with the individuals. Each portfolio score is derived from an individual's portfolio of constructed writing samples, as described above. Again, the writing samples do not include the training responses and therefore the portfolio score is not derived from any of the training responses.

At 630, the processing system computes correlation measures between portfolio score (which is one example of an external validity criterion) and each candidate feature. As described above, the correlation measures may be computed using any suitable methods, such as Pearson r, multiple regression analysis, or any other conventional method known to those of ordinary skill in the art. Also as described above, multiple sets of correlation measures may be computed, where each set is based on feature values derived from related corresponding training responses constructed by different individuals. In this context, training responses are related if they are written in response to the same or substantially similar prompt, on a substantially similar topic, in a substantially similar genre, or written under substantially similar writing conditions.

The sets of correlation measures computed at 630 may each include a correlation measure for a particular candidate feature. At 640, the correlation measures for each candidate feature are examined using at least one selection criterion to determine whether the candidate feature is consistently predictive of the external validity criterion (e.g., the portfolio score). As described above, the selection criteria may be any criteria conventionally known to one of ordinary skill in the art, and may vary between different candidate features and different types of correlation measures (e.g., correlation measures computed using Pearson r vs. multiple regression). Candidate features whose associated correlation measures satisfy the predetermined selection criteria may be used as part of the assessment model.

Figure 7A:
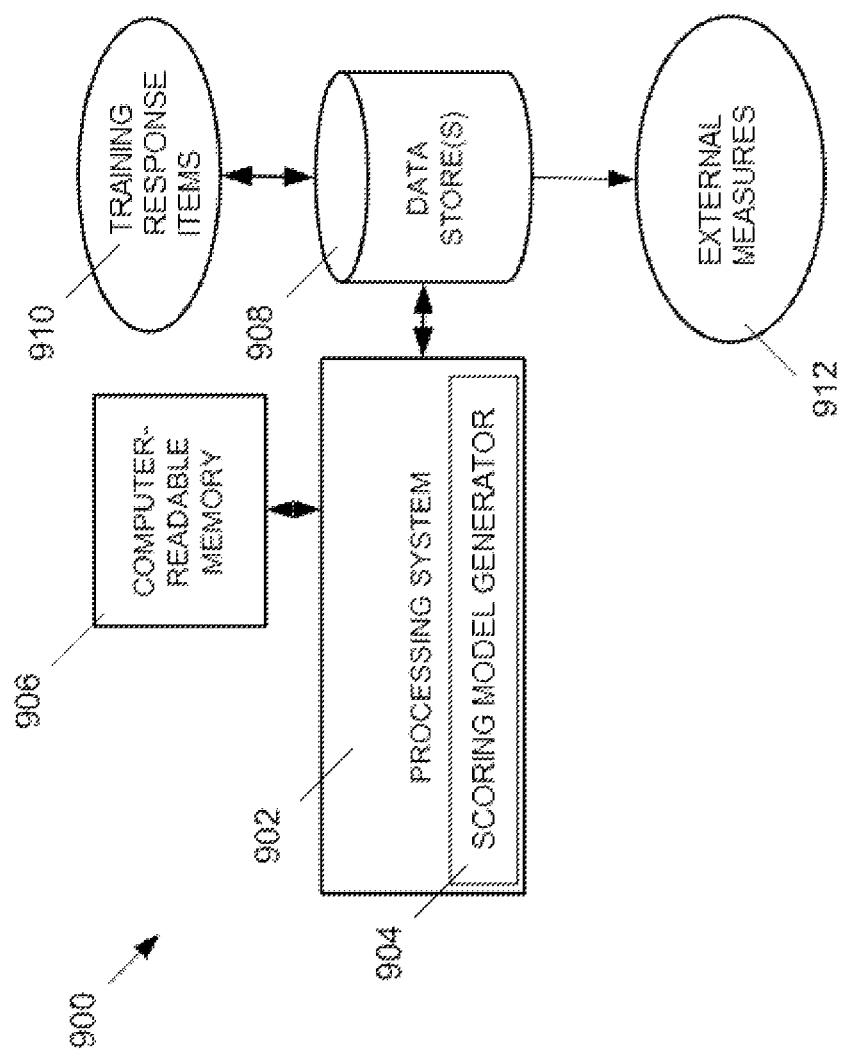
FIGS. 7A, 7B, and 7C depict example systems for use in implementing a system for generating scoring or assessment models.
Figure 7B:
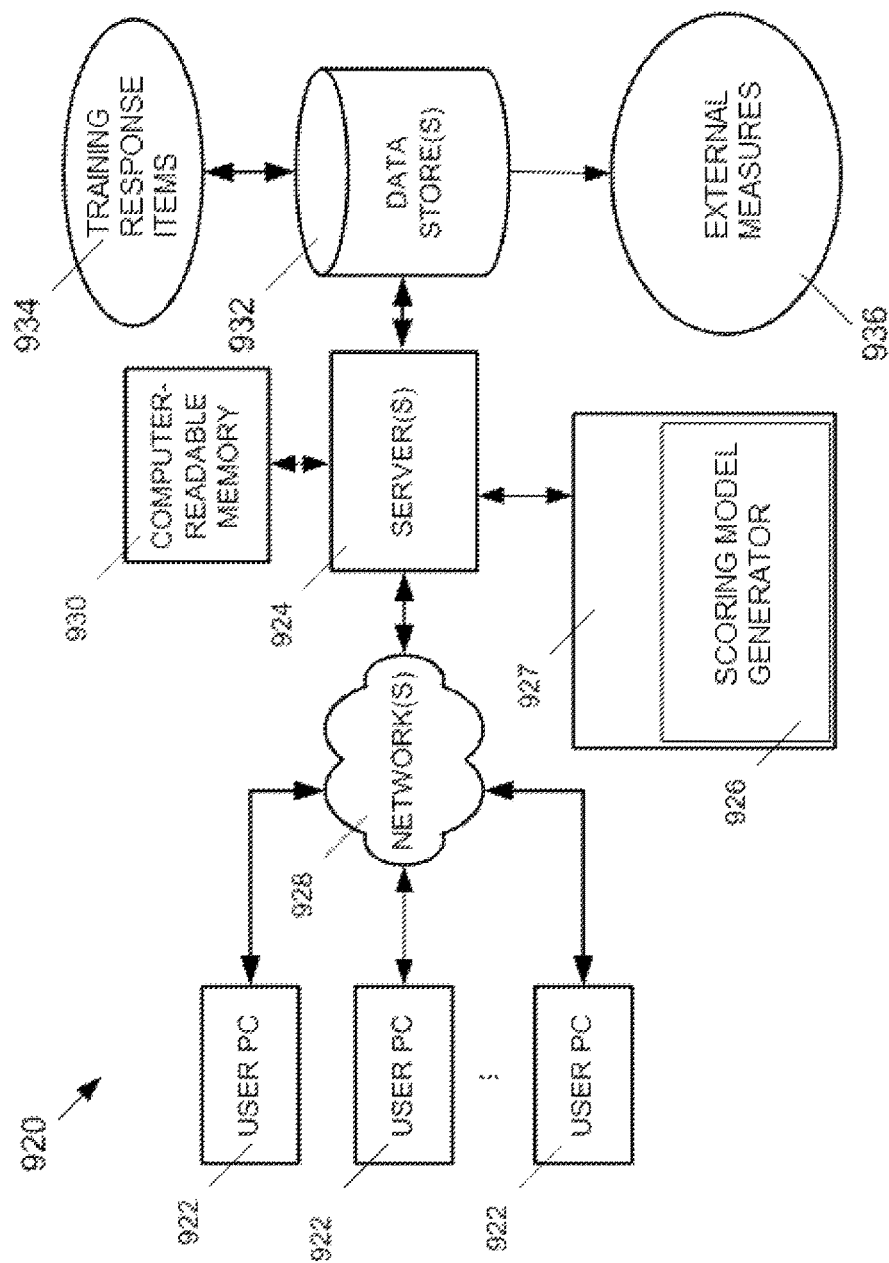
Figure 7C:
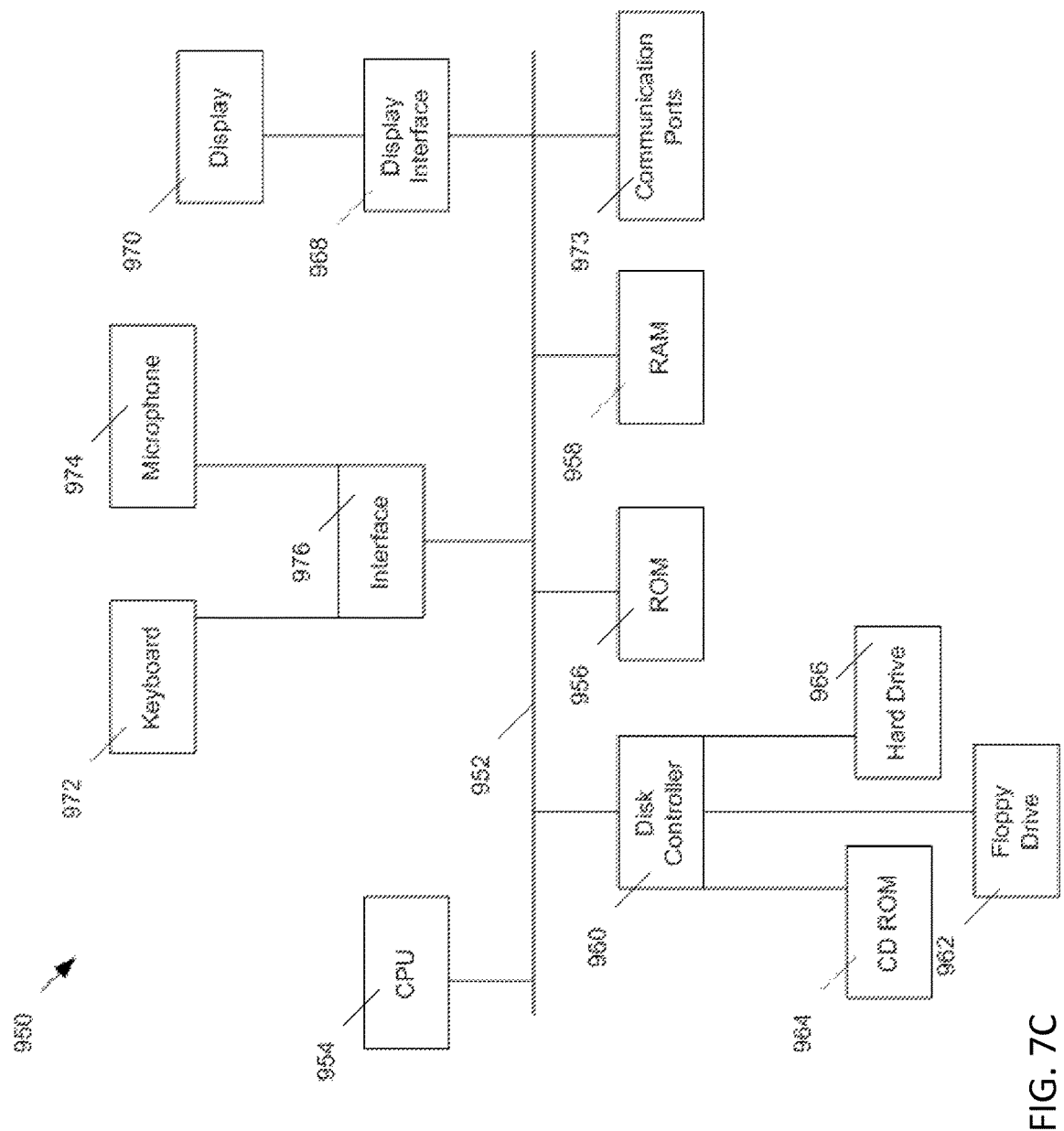

Additional examples will now be described with regard to additional exemplary aspects of implementation of the approaches described herein. FIGS. 7A, 7B, and 7C depict example systems for use in implementing a scoring/assessment model generator. For example, FIG. 7A depicts an exemplary system 900 that includes a standalone computer architecture where a processing system 902 (e.g., one or more computer processors located in a given computer or in multiple computers that may be separate and distinct from one another) includes a scoring/assessment model generator 904 being executed on it. The processing system 902 has access to a computer-readable memory 906 in addition to one or more data stores 908. The one or more data stores 908 may include training response items 910 as well as external measures/external validity criteria 912.

FIG. 7B depicts a system 920 that includes a client server architecture. One or more user PCs 922 access one or more servers 924 running a scoring/assessment model generator 926 on a processing system 927 via one or more networks 928. The one or more servers 924 may access a computer readable memory 930 as well as one or more data stores 932. The one or more data stores 932 may contain training response items 934 as well as external measures/external validity criteria 936.

FIG. 7C shows a block diagram of exemplary hardware for a standalone computer architecture 950, such as the architecture depicted in FIG. 7A that may be used to contain and/or implement the program instructions of system embodiments of the present invention. A bus 952 may serve as the information highway interconnecting the other illustrated components of the hardware. A processing system 954 labeled CPU (central processing unit) (e.g., one or more computer processors at a given computer or at multiple computers), may perform calculations and logic operations required to execute a program. A non-transitory processor-readable storage medium, such as read only memory (ROM) 956 and random access memory (RAM) 958, may be in communication with the processing system 954 and may contain one or more programming instructions for performing the method of implementing a scoring model generator. Optionally, program instructions may be stored on a non-transitory computer readable storage medium such as a magnetic disk, optical disk, recordable memory device, flash memory, or other physical storage medium.

A disk controller 960 interfaces one or more optional disk drives to the system bus 952. These disk drives may be external or internal floppy disk drives such as 962, external or internal CD-ROM, CD-R, CD-RW or DVD drives such as 964, or external or internal hard drives 966. As indicated previously, these various disk drives and disk controllers are optional devices.

Each of the element managers, real-time data buffer, conveyors, file input processor, database index shared access memory loader, reference data buffer and data managers may include a software application stored in one or more of the disk drives connected to the disk controller 960, the ROM 956 and/or the RAM 958. Preferably, the processor 954 may access each component as required.

A display interface 968 may permit information from the bus 952 to be displayed on a display 970 in audio, graphic, or alphanumeric format. Communication with external devices may optionally occur using various communication ports 973.

In addition to the standard computer-type components, the hardware may also include data input devices, such as a keyboard 972, or other input device 974, such as a microphone, remote control, pointer, mouse and/or joystick.

Additionally, the methods and systems described herein may be implemented on many different types of processing devices by program code comprising program instructions that are executable by the device processing subsystem. The software program instructions may include source code, object code, machine code, or any other stored data that is operable to cause a processing system to perform the methods and operations described herein and may be provided in any suitable language such as C, C++, JAVA, for example, or any other suitable programming language. Other implementations may also be used, however, such as firmware or even appropriately designed hardware configured to carry out the methods and systems described herein.

The systems' and methods' data (e.g., associations, mappings, data input, data output, intermediate data results, final data results, etc.) may be stored and implemented in one or more different types of computer-implemented data stores, such as different types of storage devices and programming constructs (e.g., RAM, ROM, Flash memory, flat files, databases, programming data structures, programming variables, IF-THEN (or similar type) statement constructs, etc.). It is noted that data structures describe formats for use in organizing and storing data in databases, programs, memory, or other computer-readable media for use by a computer program.

The computer components, software modules, functions, data stores and data structures described herein may be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

It should be understood that as used in the description herein and throughout the claims that follow, the meaning of "a," "an," and "the" includes plural reference unless the context clearly dictates otherwise. Also, as used in the description herein and throughout the claims that follow, the meaning of "in" includes "in" and "on" unless the context clearly dictates otherwise. Further, as used in the description herein and throughout the claims that follow, the meaning of "each" does not require "each and every" unless the context clearly dictates otherwise. Finally, as used in the description herein and throughout the claims that follow, the meanings of "and" and "or" include both the conjunctive and disjunctive and may be used interchangeably unless the context expressly dictates otherwise; the phrase "exclusive or" may be used to indicate situation where only the disjunctive meaning may apply.

What is claimed is:

1. A computer-implemented method of generating a score for an exam response using an assessment model, comprising:

receiving the exam response, the exam response associated with an examinee;

accessing a plurality of training responses with a processing system for training the assessment model for assessing responses, the training responses being constructed responses to a prompt;

analyzing the plurality of training responses with the processing system to derive multiple features-of the training responses, the multiple features indicating a proficiency of the training responses, the multiple features corresponding to variables of the assessment model;

receiving a portfolio score for the examinee, wherein the portfolio score corresponds to a measure of proficiency based on multiple writing samples constructed by the examinee, and wherein the multiple writing samples constructed by the examinee do not include any of the plurality of training responses and the portfolio score for the examinee is not derived from any of the plurality of training responses;

training the assessment model with the processing system based on the multiple features of the training responses and the portfolio score;

determining, based on said training, a weight for each of the multiple features;

calibrating the assessment model to include at least some of the multiple features based on the weight for each of the multiple features;

applying the assessment model to the exam response to determine first values of the multiple features for the exam response and to generate a score for the exam response based on the first values of the multiple features and the weights for the at least some of the multiple features;

providing the score to the examinee associated with the exam response; and transmitting the score over a computer network for display on a graphical user interface.

2. The computer-implemented method of claim 1, further comprising:

aggregating second values of the derived multiple features of the training responses that are associated with a same examinee;

wherein the training of the assessment model is based on the aggregated second values.

3. The computer-implemented method of claim 2, wherein said step of aggregating includes computing a single aggregated value for each of the training responses by using the second values of the derived multiple features.

4. The computer-implemented method of claim 1, wherein the multiple writing samples constructed by the examinee includes at least two writing samples with different topics, genres, or writing conditions.

5. The computer-implemented method of claim 1, wherein the multiple writing samples constructed by the examinee includes at least one writing sample that is on a different topic, in a different genre, or constructed under a different writing condition as that of a training response associated with the examinee, the training response is one of the plurality of training responses utilized in the training.

6. The computer-implemented method of claim 1, wherein the multiple features are treated as independent variables in the assessment model and the portfolio score is treated as a temporary dependent variable for training the assessment model.

7. A computer-implemented method of generating a score for an exam response using an assessment model, comprising:
receiving the exam response, the exam response associated with an examinee;
accessing a plurality of training responses with a processing system for training the assessment model for assessing responses, the training responses being constructed responses to a prompt;
analyzing the plurality of training responses with the processing system to derive multiple candidate features of the training responses;
receiving a portfolio score for the examinee, wherein the portfolio score corresponds to a measure of proficiency based on multiple writing samples constructed by the examinee, and wherein the multiple writing samples constructed by the examinee do not include any of the plurality of training responses and the portfolio score for the examinee is not derived from any of the plurality of training responses;
computing correlation measures with the processing system based on the derived multiple candidate features and the portfolio score;
comparing the correlation measures to at least one predetermined selection criterion;
selecting a set of features from the multiple candidate features based on said step of comparing;
training the assessment model with the processing system based on the set of features;
applying the assessment model to the exam response to determine values of the set of features for the exam response and to generate a score for the exam response based on the values of the set of features and the correlation measures;
providing the score to the examinee associated with the exam response; and
transmitting the score over a computer network for display on a graphical user interface.

8. The computer-implemented method of claim 7, wherein said step of computing correlation measures includes:
computing first correlation measures using the portfolio score and second values of the multiple candidate features that are derived from a first subset of the plurality of training responses associated with a first topic, genre, or writing condition, wherein the training responses in the first subset of the plurality of training responses are associated with different examinees, and wherein each of the first correlation measures corresponds to one of the multiple candidate features; and
computing second correlation measures using the portfolio score and third values of the multiple candidate features that are derived from a second subset of the plurality of training responses associated with a second topic, genre, or writing condition, wherein the training responses in the second subset of the plurality of training responses are associated with different examinees, and wherein each of the second correlation measures corresponds to one of the multiple candidate features;
wherein said step of comparing includes determining whether the first correlation measures and the second correlation measures satisfy the at least one predetermined selection criterion.

9. The computer-implemented method of claim 8, wherein one of the multiple candidate features is not selected if either the corresponding first correlation measure or the corresponding second correlation measure fails the at least one predetermined selection criterion.

10. The computer-implemented method of claim 7, wherein said step of computing correlation measures includes:
determining pair-wise correlations between the portfolio score and each of the multiple candidate features; and
determining a weight for each of the multiple candidate features by training a model where a mathematical combination of the multiple candidate features is equated to the portfolio score;
wherein said step of comparing includes comparing the determined pair-wise correlations with the determined weights of the multiple candidate features.

11. A non-transitory computer-readable medium encoded with instructions for causing a processing system to execute steps for generating a score for an exam response using an assessment model, comprising:
receiving the exam response, the exam response associated with an examinee;
accessing a plurality of training responses with a processing system for training the assessment model for assessing responses, the training responses being constructed responses to a prompt;
analyzing the plurality of training responses with the processing system to derive multiple features of the training responses, the multiple features indicating a proficiency of the training responses, the multiple features corresponding to variables of the assessment model;
receiving a portfolio score for the examinee, wherein the portfolio score corresponds to a measure of proficiency based on multiple writing samples constructed by the examinee, and wherein the multiple writing samples constructed by the examinee do not include any of the plurality of training responses and the portfolio score for the examinee is not derived from any of the plurality of training responses;
training the assessment model with the processing system based on the multiple features of the training responses and the portfolio score;
determining, based on said training, a weight for each of the multiple features;
calibrating the assessment model to include at least some of the multiple features based on the weight for each of the multiple features;
applying the assessment model to the exam response to determine values of the multiple features for the exam response and to generate a score for the exam response based on the values of the multiple features and the weights for the at least some of the multiple features;
providing the score to the examinee associated with the exam response; and
transmitting the score over a computer network for display on a graphical user interface.

12. The non-transitory computer-readable medium of claim 11, further comprising instructions for causing the processing system to execute steps, including:
   aggregating second values of the derived multiple features of the training responses that are associated with a same examinee;
   wherein the training of the assessment model is based on the aggregated second values.

13. The non-transitory computer-readable medium of claim 12, wherein said step of aggregating includes computing a single aggregated value for each of the training responses by using the second values of the derived multiple features.

14. The non-transitory computer-readable medium of claim 11, wherein the multiple writing samples constructed by the examinee includes at least two writing samples with different topics, genres, or writing conditions.

15. The non-transitory computer-readable medium of claim 11, wherein the multiple writing samples constructed by the examinee includes at least one writing sample that is on a different topic, in a different genre, or constructed under a different writing condition as that of a training response associated with the examinee, the training response is one of the plurality of training responses utilized in the training.

16. The non-transitory computer-readable medium of claim 11, wherein the multiple features are treated as independent variables in the assessment model and the portfolio score is treated as a temporary dependent variable for training the assessment model.

17. A non-transitory computer-readable medium encoded with instructions for causing a processing system to execute steps generating a score for an exam response using an assessment model, comprising:
   receiving the exam response, the exam response associated with an examinee;
   accessing a plurality of training responses with a processing system, the training responses being constructed responses to a prompt;
   analyzing the plurality of training responses with the processing system to derive multiple candidate features of the training responses;
   receiving a portfolio score for the examinee, wherein the portfolio score corresponds to a measure of proficiency based on multiple writing samples constructed by the examinee, and wherein the multiple writing samples constructed by the examinee do not include any of the plurality of training responses and the portfolio score for the examinee is not derived from any of the plurality of training responses;
   computing correlation measures with the processing system based on the derived multiple candidate features and the portfolio score;
   comparing the correlation measures to at least one predetermined selection criterion;
   selecting a set of features from the multiple candidate features based on said step of comparing;
   training the assessment model with the processing system based on the set of features;
   applying the assessment model to the exam response to determine values of the set of features for the exam response and to generate a score for the exam response based on the values of the set of features and the correlation measures;
   providing the score to the examinee associated with the exam response; and
   transmitting the score over a computer network for display on a graphical user interface.

18. The non-transitory computer-readable medium of claim 17, wherein said step of computing correlation measures includes:
   computing first correlation measures using the portfolio score and second values of the multiple candidate features that are derived from a first subset of the plurality of training responses associated with a first topic, genre, or writing condition, wherein the training responses in the first subset of the plurality of training responses are associated with different examinees, and wherein each of the first correlation measures corresponds to one of the multiple candidate features; and
   computing second correlation measures using the portfolio score and third values of the multiple candidate features that are derived from a second subset of the plurality of training responses associated with a second topic, genre, or writing condition, wherein the training responses in the second subset of the plurality of training responses are associated with different examinees, and wherein each of the second correlation measures corresponds to one of the multiple candidate features;
   wherein said step of comparing includes determining whether the first correlation measures and the second correlation measures satisfy the at least one predetermined selection criterion.

19. The non-transitory computer-readable medium of claim 18, wherein one of the multiple candidate features is not selected if either the corresponding first correlation measure or the corresponding second correlation measure fails the at least one predetermined selection criterion.

20. The non-transitory computer-readable medium of claim 17, wherein said step of computing correlation measures includes:
   determining pair-wise correlations between the portfolio score and each of the multiple candidate features; and
   determining a weight for each of the multiple candidate features by training a model where a mathematical combination of the multiple candidate features is equated to the portfolio score;
   wherein said step of comparing includes comparing the determined pair-wise correlations with the determined weights of the multiple candidate features.

21. A system for generating scores for an exam response using an assessment model, comprising:
   a processing system; and
   a memory coupled to the processing system, wherein the processing system is configured to execute steps, comprising:
      receiving the exam response, the exam response associated with an examinee;
      accessing a plurality of training responses with a processing system for training the assessment model for assessing responses, the training responses being constructed responses to a prompt;
      analyzing the plurality of training responses with the processing system to derive multiple features of the training responses, the multiple features indicating a proficiency of the training responses, the multiple features corresponding to variables of the assessment model;
      receiving a portfolio score for the examinee, wherein the portfolio score corresponds to a measure of proficiency based on multiple writing samples constructed by the examinee, and wherein the multiple writing samples constructed by the examinee do not include any of the plurality of training responses and the portfolio score for the examinee is not derived from any of the plurality of training responses;

training the assessment model with the processing system based on the multiple features of the training responses and the portfolio score;

determining, based on said training, a weight for each of the multiple features;

calibrating the assessment model to include at least some of the multiple features based on the weight for each of the multiple features;

applying the assessment model to the exam response to determine values of the multiple features for the exam response and to generate a score for the exam response based on the values of the multiple features and the weights for the at least some of the multiple features;

providing the score to the examinee associated with the exam; and transmitting the score over a computer network for display on a graphical user interface.

22. The system of claim 21, wherein the processing system is further configured to execute steps, including:

aggregating second values of the derived multiple features of the training responses that are associated with a same examinee;

wherein the training of the assessment model is based on the aggregated second values.

23. The system of claim 22, wherein said step of aggregating includes computing a single aggregated value for each of the training responses by using the second values of the derived multiple features.

24. The system of claim 21, wherein the multiple writing samples constructed by the examinee includes at least two writing samples with different topics, genres, or writing conditions.

25. The system of claim 21, wherein the multiple writing samples constructed by the examinee includes at least one writing sample that is on a different topic, in a different genre, or constructed under a different writing condition as that of a training response associated with the examinee, the training response is one of the plurality of training responses utilized in the training.

26. The system of claim 21, wherein the multiple features are treated as independent variables in the assessment model and the portfolio score is treated as a temporary dependent variable for training the assessment model.

27. A system generating a score for an exam response using an assessment model, comprising:

a processing system; and a memory coupled to the processing system, wherein the processing system is configured to execute steps, comprising:

receiving the exam response, the exam response associated with an examinee;

accessing a plurality of training responses with a processing system, the training responses being constructed responses to a prompt;

analyzing the plurality of training responses with the processing system to derive multiple candidate features of the training responses;

receiving a portfolio score for the examinee, wherein the portfolio score corresponds to a measure of proficiency based on multiple writing samples constructed by the examinee, and wherein the multiple writing samples constructed by the examinee do not include any of the plurality of training responses and the portfolio score for the examinee is not derived from any of the plurality of training responses;

computing correlation measures with the processing system based on the derived values of the multiple candidate features and the portfolio score;

comparing the correlation measures to at least one predetermined selection criterion;

selecting a set of features from the multiple candidate features based on said step of comparing;

training the assessment model with the processing system based on the set of features;

applying the assessment model to the exam response to determine values of the set of features for the exam response and to generate a score for the exam response based on the values of the set of features and the correlation measures;

providing the score to the examinee associated with the exam response; and transmitting the score over a computer network for display on a graphical user interface.

28. The system of claim 27, wherein said step of computing correlation measures includes:

computing first correlation measures using the portfolio score and second values of the multiple candidate features that are derived from a first subset of the plurality of training responses associated with a first topic, genre, or writing condition, wherein the training responses in the first subset of the plurality of training responses are associated with different examinees, and wherein each of the first correlation measures corresponds to one of the multiple candidate features; and computing second correlation measures using the portfolio score and third values of the multiple candidate features that are derived from a second subset of the plurality of training responses associated with a second topic, genre, or writing condition, wherein the training responses in the second subset of the plurality of training responses are associated with different examinees, and wherein each of the second correlation measures corresponds to one of the multiple candidate features;

wherein said step of comparing includes determining whether the first correlation measures and the second correlation measures satisfy the at least one predetermined selection criterion.

29. The system of claim 28, wherein one of the multiple candidate features is not selected if either the corresponding first correlation measure or the corresponding second correlation measure fails the at least one predetermined selection criterion.

30. The system of claim 27, wherein said step of computing correlation measures includes:

determining pair-wise correlations between the portfolio score and each of the multiple candidate features; and determining a weight for each of the multiple candidate features by training a model where a mathematical combination of the multiple candidate features is equated to the portfolio score;

wherein said step of comparing includes comparing the determined pair-wise correlations with the determined weights of the multiple candidate features.

\* \* \* \* \*